United States Patent [19]

Aoki

[11] Patent Number: 5,572,506
[45] Date of Patent: Nov. 5, 1996

[54] OPTICAL INFORMATION RECORDING MEDIUM WITH GAP AREA CAPABLE FOR PREFORMATTING WITH A SPECIFIED PATTERN

[75] Inventor: Ikuo Aoki, Yokohama, Japan

[73] Assignee: Ricoh Company, Ltd., Tokyo, Japan

[21] Appl. No.: 373,643

[22] Filed: Jan. 17, 1995

Related U.S. Application Data

[62] Division of Ser. No. 57,104, May 3, 1993, Pat. No. 5,414,692.

[30] Foreign Application Priority Data

May 8, 1992 [JP] Japan ................................ 4-115963

[51] Int. Cl.⁶ .................................................. G11B 7/24
[52] U.S. Cl. ................................ 369/275.3; 369/58
[58] Field of Search .......................... 369/275.3, 275.2, 369/275.1, 54, 58, 48, 47; 360/40, 41, 48, 50, 51

[56] References Cited

U.S. PATENT DOCUMENTS 5,202,878  4/1993  Kanehira et al. .................. 369/100
5,218,590  6/1993  Miyasaka .......................... 369/54
5,233,584  8/1993  Kulakowski et al. ............... 369/58
5,400,309  3/1995  Satomura .......................... 369/48
5,422,874  6/1995  Birukawa et al. ................. 369/275.4

*Primary Examiner*—Tan Dinh
*Attorney, Agent, or Firm*—Cooper & Dunham LLP

[57] ABSTRACT

An optical information recording medium in the form of an magneto-optical recording disk with a sector format preformatted in accordance with a mark edge recording method, wherein two types of preformat patterns are provided for an area VFO2 for a PLL, positioned after an area ID1 or an area ID2 indicating a track number or a sector number, with one pattern being selected from the two types of preformat patterns and being preformatted, depending upon whether a prepit preformatted in the area ID1 or the area ID2 is completed within the area ID1 or the area ID2, or is discontinued in the area ID1 or the area ID2. The optical information recording medium may be in the form of a 90 mm ROM disk or a 90 mm magneto-optical recording disk including a partial ROM section, provided with a sector format which is preformatted in accordance with the mark edge recording method, wherein a specified data pattern is preformatted in an area GAP or wherein a specified data pattern is preformatted in part or all of areas GAP, FLAG, GAP, and ALPC.

6 Claims, 8 Drawing Sheets

OPTICAL INFORMATION RECORDING MEDIUM WITH GAP AREA CAPABLE FOR PREFORMATTING WITH A SPECIFIED PATTERN

This is a division of application Ser. No 057,104, filed May 3, 1993 and now U.S. Pat. No. 5,414,692.

BACKGROUND OF THE INVENTION

1. Field of the Invention

The present invention relates to an optical information recording medium in the form of a magneto-optical recording disk (90 mm ROM disk, 130 mm ROM disk, and the like) for a mark edge recording method used in a magneto-optical disk drive device, a CD-ROM device, a CD-R device, or the like.

2. Discussion of Background

Conventionally, the sector format for this type of magneto-optical recording disk is stipulated. Various types of format configurations have been proposed. Basically, the format comprises an address section, a flag section, a data section, and a buffer section.

Under the present ISO (International Standards Organization) standards, the sector format for a 90 mm magneto-optical recording disk is standardized as shown in FIG. 7, and for a 130 mm magneto-optical recording disk as shown in FIG. 8 (for 1024 user bytes) and as shown in FIG. 9 (for 512 user bytes). These correspond to sector formats for a continuous servo tracking method (composite continuous tracking method) for detecting a tracking error signal using, for example, a push-pull method.

The main areas in the figures will now be explained. An area SM (sector mark) indicates an area for detecting the head of a sector. Areas VFO1 to VFO3 show a continuously repeated data pattern for reliably reproducing data, even when there is a change in disk rotation, and are used for generating a clock for reading the data with a PLL (phase-locked loop) being locked in this pattern. An AM (address mark) shows an initial detection position (synchronous position) for reading an address code data, into which a special code pattern is inserted. An area SYNC or an area Sync is used for synchronous signals for a data section. An area ID shows an address, and an area CRC is used for a code for detecting errors in the ID section. An area ODF (offset detection flag=mirror surface section) is a mark region for detection of an offset for detecting tracking errors using the push-pull method, and is formed in a mirror surface area without either grooves or preformatted data. An area GAP shows a region without data with a specified byte. An area FLAG shows a flag region indicating that a write-in has been performed. An area ALPC (Auto Laser Power Control) shows a blank region which is a test section for controlling the power level of a laser beam source.

These sector formats are standardized so that they are suitable for a CAV (Constant Angular Velocity) code, a (2, 7) RLL modulating code (RLL is an abbreviation for Run Length Limited), and a mark position recording method.

In addition, for the current ISO standards, activities are progressing for the formulation of the next generation of standards, aiming at high speed and high density. Various methods have been proposed for the high speed and high density required for the next generation. One of these proposals is to combine MCAV (Modified CAV), the (1, 7) RLL modulation code, and the mark edge recording method. Specifically, if the mark edge recording method, which is suitable for high density recording in the next generation of standards, is adopted, the (1, 7) RLL modulation code will be the most suitable data modulation code.

In the case where a method is adopted which combines this type of MCAV, (1, 7) RLL modulation code, and mark edge recording method, it is obvious that the sector format for the current ISO standards cannot be used without modification, and some changes and innovations are necessary to eliminate problems of the following types:

First, the number of bits for one byte is changed by changing the modulation code used (modulation code without DC-free characteristics). Specifically, with a (2, 7) RLL modulation code, there are 16 bits per byte, while with a (1, 7) RLL modulation code, there are 12 bits per byte. In addition, the AM, the VFO1 to VFO3, and the Sync pattern and others, must also be changed to suit the modulation code used.

Second, changing the recording method from a mark position recording method to the mark edge recording method, changes the shape of a prepit preformatted in the ID section of the disk, and lengthens the prepit, so that it is necessary to provide a device which minimizes the adverse effects on a tracking control system. Also, a characteristic problem in the mark edge recording method is that because the modulated data is preformatted by an NRZI code (Non-Return to Zero Inverted code) pattern, it may occurs that the prepit is not completed, depending upon the number of 1's in the modulated data, and if this takes place, the prepit becomes discontinued part way through. In such a case, a means is required to ensure that the prepit is not incomplete and is not discontinued part way through.

FIG. 10 shows this situation. FIG. 10 schematically shows a two-byte arrangement for an address mark AM. In this case, the number of continuous zero becomes rather long because a code with strong autocorrelation is used as the address mark AM. For this reason, when a prepit 1 is not completed in the area VFO2, the prepit becomes rather long as shown in (b) in FIG. 10, so that the amplitude of the tracking error signal becomes small, and the tracking control system becomes unstable. As a result, an erroneous count occurs in the number of jumped tracks during a seek operation, which is a problem. Accordingly, the prepit 1 should be completed within the area VFO2.

Third, when considering an area SM in the preformatting of the current ISO standards, for a 90 mm magneto-optical recording disk as shown in FIG. 11, and for a 130 mm magneto-optical recording disk as shown in FIG. 12, since a Long Mark Pattern is preformatted, the amplitude of a track error signal which is detected from the area SM is reduced, and the wave form is warped, so that not only does the tracking control system become unstable, but there is the problem that an erroneous count of the number of jumped tracks is produced during a seek operation. When taking this point into consideration, if the format configuration is such that the head of the sector is reliably detected even when the area SM is not used, the problem can be solved by omitting the area SM.

SUMMARY OF THE INVENTION

It is therefore an object of the present invention, with due consideration to the drawbacks of such conventional optical information recording media, to provide an optical information recording medium for the mark edge recording method, with minimal changes in the sector format, and high compatibility whereby it is also possible to read a disk of the current ISO standards, without any adverse effects on a tracking control system and on a seek system, and which provides optimized sector preformatting in the (1, 7) RLL modulation code and is suitable for high speed and high density use.

The above object of the present invention is achieved by a first embodiment of an optical information recording medium according to the present invention, which is in the form of an magneto-optical recording disk with a sector format preformatted in accordance with a mark edge recording method, wherein two types of preformat patterns are provided in an area VFO2 for a PLL, positioned after an area ID1 or an area ID2 indicating a track number or a sector number, with one pattern being selected from the two types of preformat patterns and being preformatted, depending upon whether a prepit preformatted in the area ID1 or the area ID2 is completed within the area ID1 or ID2 or is discontinued in the area ID1 or the area ID2.

When a (1, 7) RLL modulation code is used in the above first embodiment of the present invention, the two types of preformat patterns are a pair of '001010101010 . . . 10101000' and '001010101010 . . . 10101010'; a pair of '000101010101 . . . 01010100' and '000101010101 . . . 01010101'; or a pair of '010101010101 . . . 01010101' and '010101010101 . . . 01010100'.

The object of the present invention is also achieved by a second embodiment of an optical information recording medium according to the present invention, which is in the form of a 90 mm ROM disk or a 90 mm magneto-optical recording disk including a partial ROM section, provided with a sector format which is preformatted in accordance with a mark edge recording method wherein a specified data pattern is preformatted in an area GAP, which may be positioned after an area ODF (offset detection flag).

In the above-mentioned second embodiment of the present invention, the specified pattern may be identical to a preformatted pattern for an area VFO3 positioned after the area GAP.

The object of the present invention can also be achieved by a third embodiment of an optical information recording medium according to the present invention which is in the form of a 130 mm ROM disk or a 130 mm magneto-optical recording disk including a partial ROM section, provided with a sector format which is preformatted by a mark edge recording method, wherein a specified data pattern is preformatted in part or all of areas GAP, FLAG, GAP, and ALPC, which may be positioned after an area ODF (offset detection flag).

In the above-mentioned third embodiment of the present invention, the specified pattern may be identical to a preformatted pattern for an area VFO3 positioned after the areas GAP, FLAG, GAP, and ALPC.

In the above-mentioned second and third embodiments of the optical information recording medium according to the present invention, a sector mark SM for detecting the head of a sector may be eliminated from the sector format.

BRIEF DESCRIPTION OF THE DRAWINGS

A more complete appreciation of the invention and many of the attendant advantages thereof will be readily obtained as the same becomes understood by reference to the following detailed description when considered in connection with the accompanying drawings, wherein.

DESCRIPTION OF THE PREFERRED EMBODIMENTS

Figure 1:
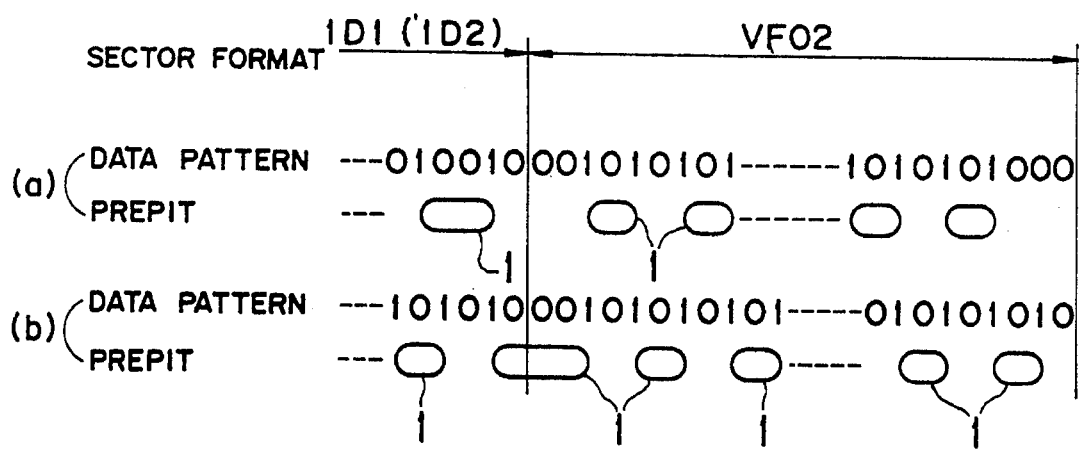
FIG. 1 is a schematic diagram for explaining a first embodiment of the present invention.
Figure 2:
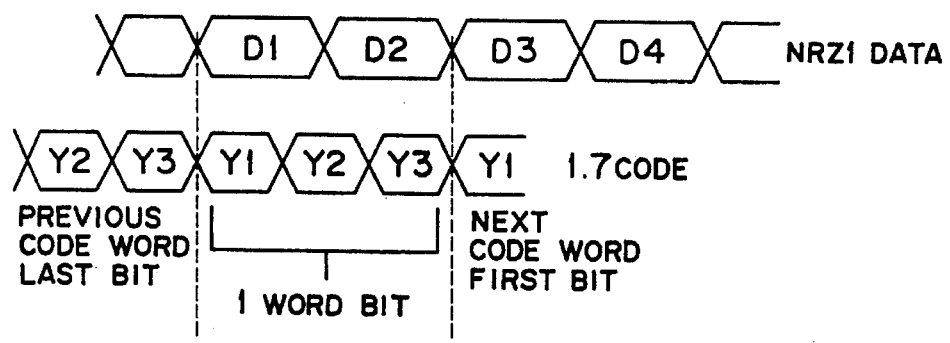
FIG. 2 is a schematic diagram showing an example of a (1, 7) RLL code.

With reference to FIG. 1 and FIG. 2, a first embodiment of an optical information recording medium according to the present invention will now be explained, which is in the form of an magneto-optical recording disk with a sector format preformatted in accordance with the mark edge recording method, wherein two types of preformat patterns are provided in an area VFO2 for a PLL, positioned after an area ID1 or an area ID2 indicating a track number or a sector number, with one pattern being selected from the two types of preformat patterns and being preformatted, depending upon whether a prepit preformatted in the area ID1 or the area ID2 is completed within the area ID1 or the area ID2 (refer to (a) in FIG. 1) or the prepit is discontinued in that area (refer to (b) in FIG. 1).

By providing the sector format in this manner, even in the case where the prepit 1 is not completed within the area ID1 or ID2, the prepit can be reliably completed in the area VFO2, and the length of the prepit 1 can be minimized.

In the example shown in FIG. 1, the following two types of preformat patterns are provided for preformatting the area VFO2: '001010101010 . . . 10101000' and '001010101010 . . . 10101010' (where ' . . . ' indicates that the preceding pattern is repeated continuously). The former is selected for the ID which is completed as shown in (a) in FIG. 1, and the latter is selected for the ID which is discontinued part way through, as shown in (b) in FIG. 1.

These two types of patterns are examples of effective patterns for a representative (1, 7) RLL modulating code shown in the following Table 1. In the table, "X" shows a code which is opposite in sign to the immediately preceding modulating bit.

TABLE 1

| Information bit | Modulation bit |
|---|---|
| 01 | X00 |
| 10 | 010 |
| 11 | X01 |
| 0001 | X00001 |
| 0010 | X00000 |
| 0011 | 010001 |
| 0000 | 010000 |

The (1, 7) RLL modulating code shown in Table 1 is converted to a 3-bit or 6-bit modulated data in accordance with a modulation code pattern, so that the modulated data obtained by modulating an original signal of one byte (=8 bits) has a variable length. As a result, the remaining bit pattern for the modulated data from an area CRC positioned immediately before the area VFO2 is '001' or '000'. For the modulation, either pattern is set in advance, and the set pattern is caused to conform to the top three bits of the area VFO2.

The first embodiment shown in FIG. 1 illustrates the case where the remaining bit pattern for the modulated data from the area CRC is '001'. However, in the case where the remaining bit pattern for the modulated data is '000', the two types of patterns as a preformat pattern for preformatting the area VFO2 may be '000101010101 . . . 01010100', and '000101010101 . . . 01010101'.

Also, in the case of the (1, 7) RLL modulating code according to the standards as shown in FIG. 2 and Table 2, the modulated data when an original signal of one byte (=8 bits) is modulated is necessarily 12 bits, so that the two types of patterns as a preformat pattern for preformatting the area VFO2, are not subjected to the above-described restrictions and are as follows: '010101010101 . . . 01010101', and '010101010101 . . . 01010100'. In Table 2, 'X' indicates ignored (don't care), and '*' indicates that at least one is not zero.

TABLE 2

| Previous code word last bit | Data bits Present | | Next | | Code bits | | |
|---|---|---|---|---|---|---|---|
| X | 0 | 1 | 0 | 0 | X | 1 | 0 | 1 |
| X | 0 | 1 | 0 | 1 | X | 0 | 1 | 0 |
| X | 0 | 1 | 1 | 0 | 0 | 0 | 1 | 0 |
| X | 0 | 1 | 1 | * | * | 1 | 0 | 0 |
| 1 | 0 | 0 | 0 | 0 | X | 0 | 0 | 1 |
| 1 | 0 | 0 | 0 | 1 | X | 0 | 0 | 0 |
| 0 | 0 | 0 | 1 | 0 | X | 0 | 0 | 1 |
| 0 | 0 | 0 | 1 | 1 | X | 0 | 0 | 0 |
| X | 1 | 0 | 0 | 0 | X | 0 | 0 | 1 |
| X | 1 | 0 | 0 | 1 | X | 0 | 1 | 0 |
| X | 1 | 0 | 1 | 0 | 0 | 0 | 1 | 0 |
| X | 1 | 0 | 1 | * | * | 0 | 0 | 0 |
| Y2 | Y3 | D1 | D2 | D3 | D4 | Y1 | Y2 | Y3 |

The present invention is not limited to the patterns shown in these examples but can be structured in compliance with a modulation code such as the (2, 7) RLL. Furthermore, the present invention is capable of providing an extremely effective format configuration for an magneto-optical recording disk on which prepits are preformatted according to an NRZI pattern which is characteristic of the mark edge recording method.

Figure 3:
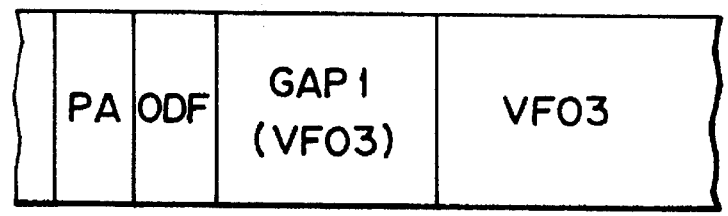
FIG. 3 is a schematic diagram of a sector format for explaining a second embodiment of the present invention.

A second embodiment of the present invention will now be explained with reference to FIG. 3. In this embodiment, an optimum preformat for a full ROM or partial ROM with respect to a 90 mm magneto-optical recording disk is stipulated.

Specifically, according to the current ISO standards for the ROM section of a 90 mm magneto-optical recording disk, the area GAP1 is unnecessary for the format. Therefore, a specified data pattern, for example, the same pattern as the pattern preformatted in the area VFO3 is preformatted in the area GAP1 as shown by the parentheses in FIG. 3.

In this manner, by preformatting a specified data pattern in the unnecessary area GAP1, it is possible to assist the PLL lead-in. When the preformat pattern is the same as for the subsequent area VFO3 as in this embodiment, this is substantially equivalent to the expansion of the area VFO3, and the time for the PLL lead-in is increased, so that surplus time is available and it is possible to reliably lock the PLL.

Further, in the case of a 90 mm magneto-optical recording disk with a partial ROM section, it is sufficient to have a preformat configuration for the ROM section only. The parentheses in FIG. 3 indicate this. That is, the area GAP1 remains the same except the ROM section.

Figure 4:
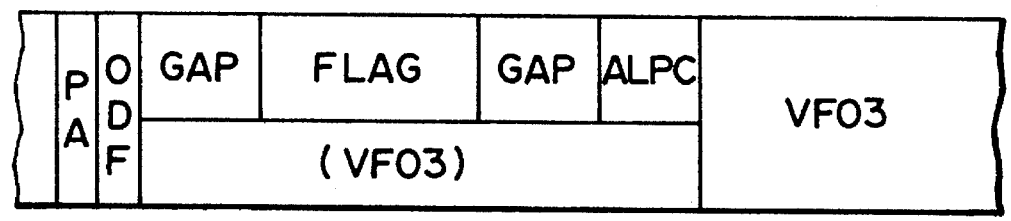
FIG. 4 is a schematic diagram of a sector format for explaining a third embodiment of the present invention.

A third embodiment of the present invention will now be explained with reference to FIG. 4.

In this embodiment, the technical idea of the above-mentioned second embodiment is applied to a 130 mm magneto-optical recording disk. Specifically, according to the current ISO standards for the ROM section of a 130 mm magneto-optical recording disk, the areas GAP, FLAG, GAP, ALPC are unnecessary. Therefore, a specified data pattern, for example, the same pattern as the pattern preformatted in the area VFO3 is preformatted in all these areas (or one section) as shown by the parentheses in FIG. 4. Thus, by preformatting a specified data pattern in the unnecessary areas GAP, FLAG, GAP, ALPC, it is possible to assist the PLL lead-in. When the preformat pattern is the same as the subsequent area VFO3 as in this embodiment, this is substantially equivalent to the expansion of the area VFO3. Thus, the time for the PLL lead-in is increased, so that surplus time is available and it is possible to reliably lock the PLL.

Further, in this embodiment, in the case of a 130 mm magneto-optical recording disk with a partial ROM section, it is sufficient to have such a preformat configuration for the ROM section only. The parentheses in FIG. 4 indicate this. That is, the area GAP1 remains the same except the ROM section.

Figure 5:
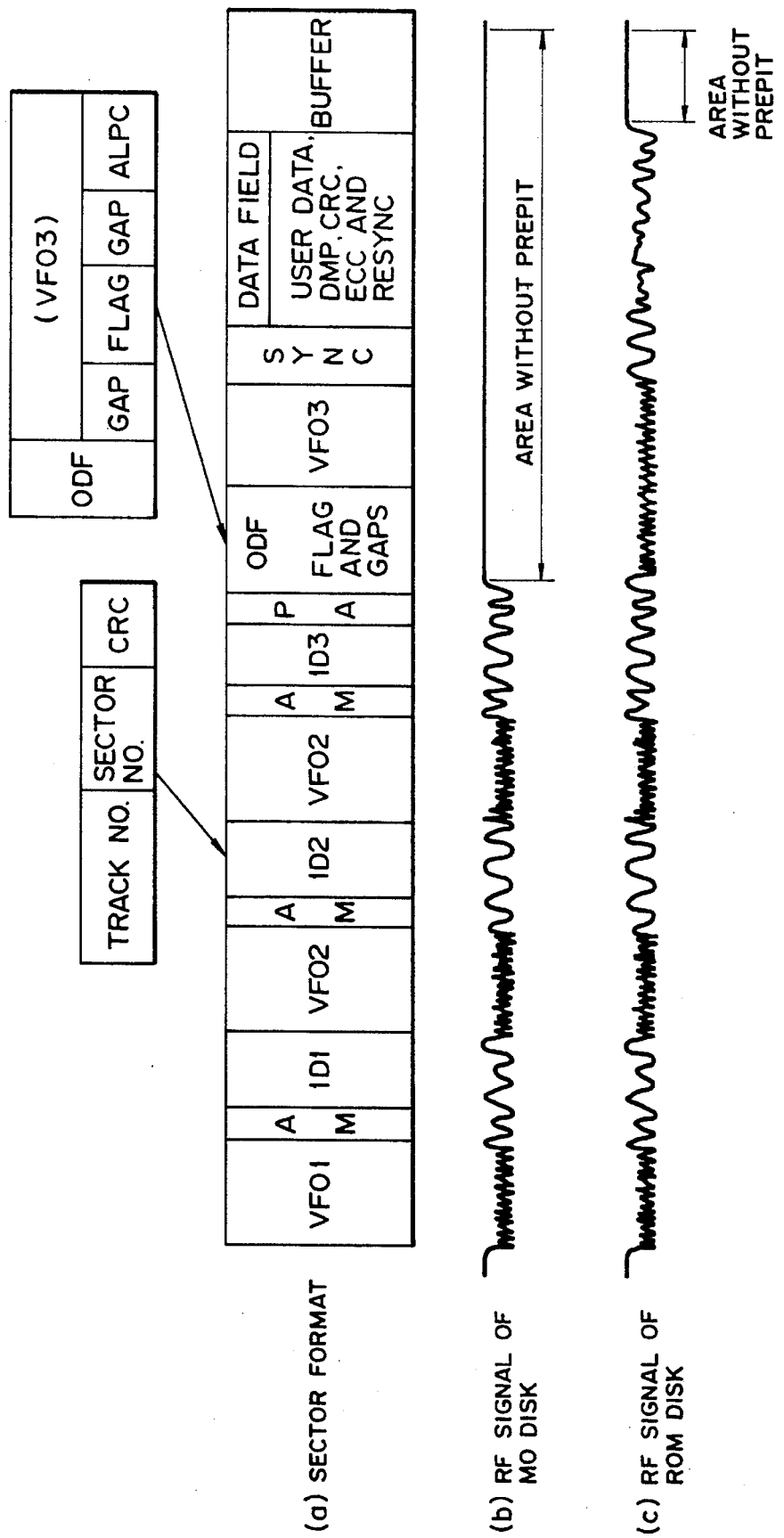
FIG. 5 is a schematic diagram for explaining the second and third embodiments of the present invention, in which a sector mark SM for detecting the head of a sector is eliminated from the sector format, including a signal waveform corresponding thereto.
Figure 6:
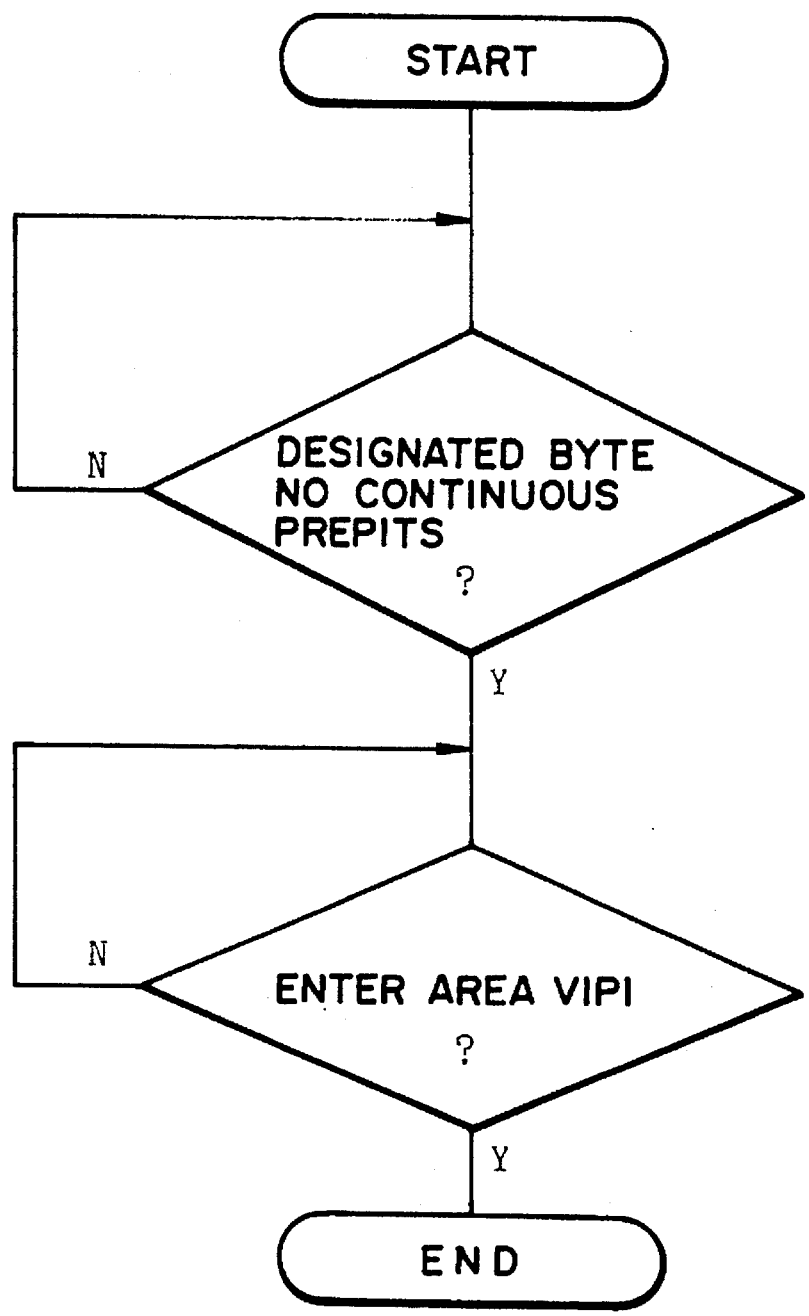
FIG. 6 is a flowchart showing an algorithm for detecting a sector head.
Figure 7:
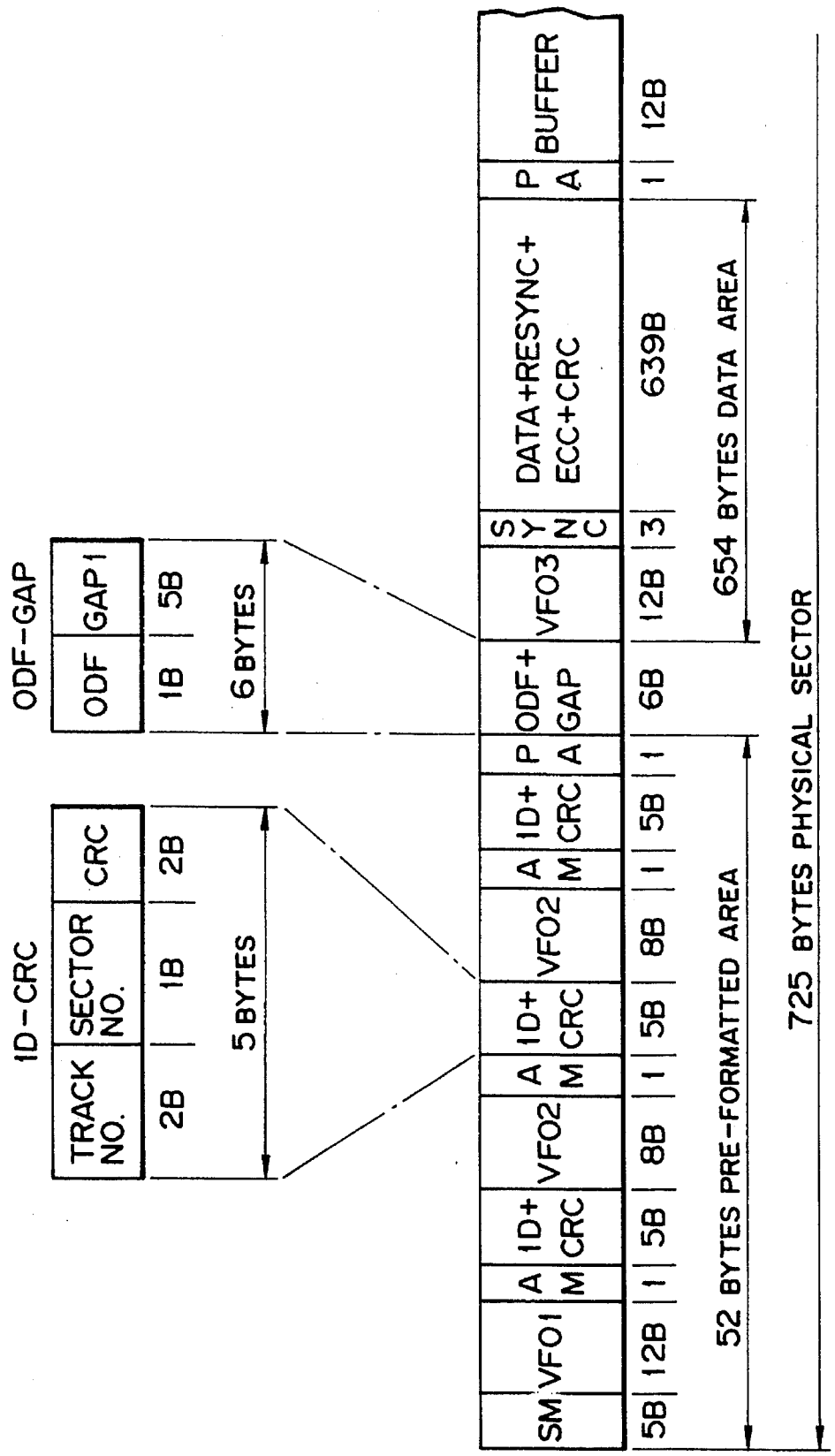
FIG. 7 is a schematic diagram showing a sector format according to the current ISO standards for a 90 mm magneto-optical recording disk.
Figure 8:
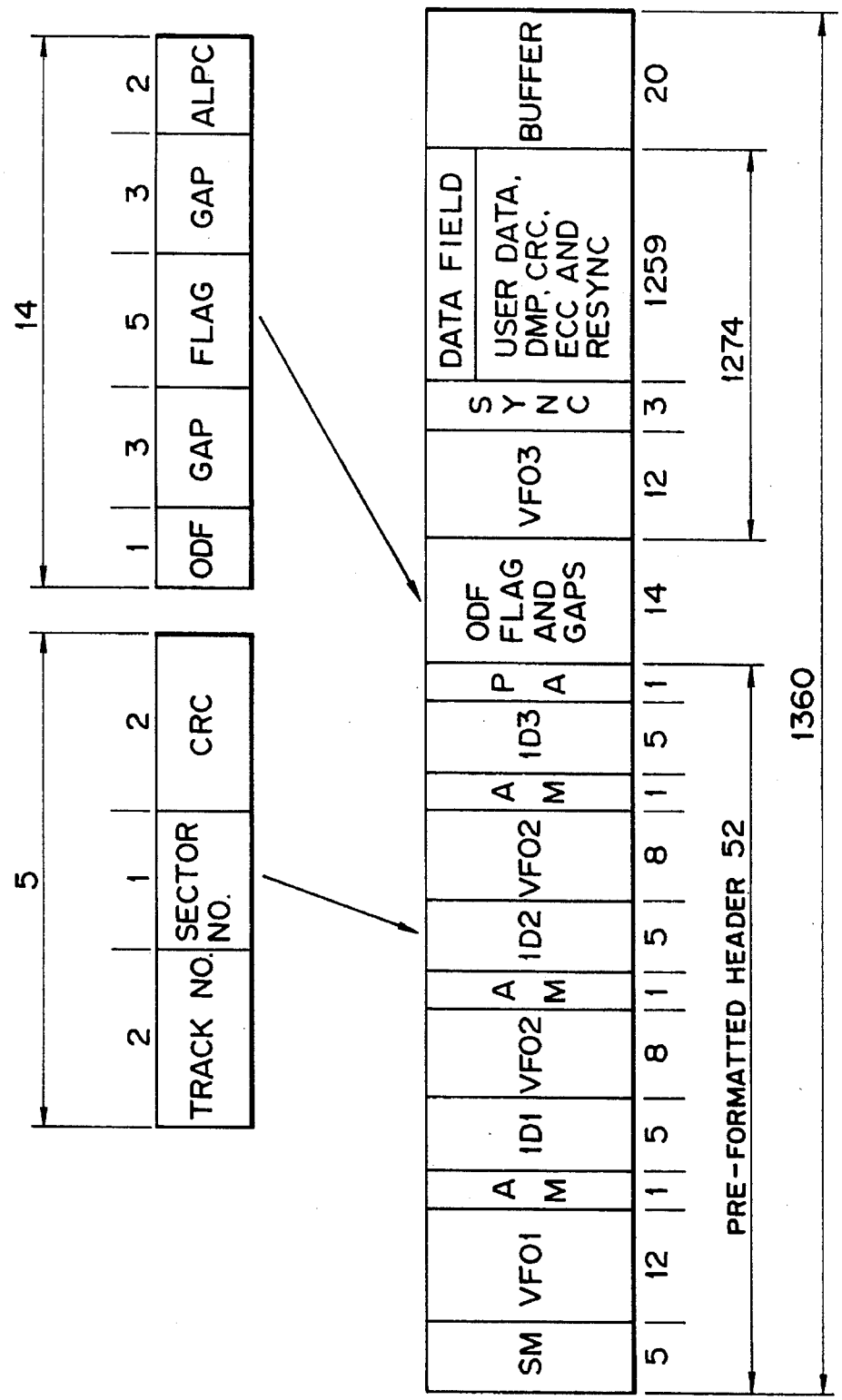
FIG. 8 is a schematic diagram showing a sector format according to the current ISO standards for a 130 mm magneto-optical recording disk.
Figure 9:
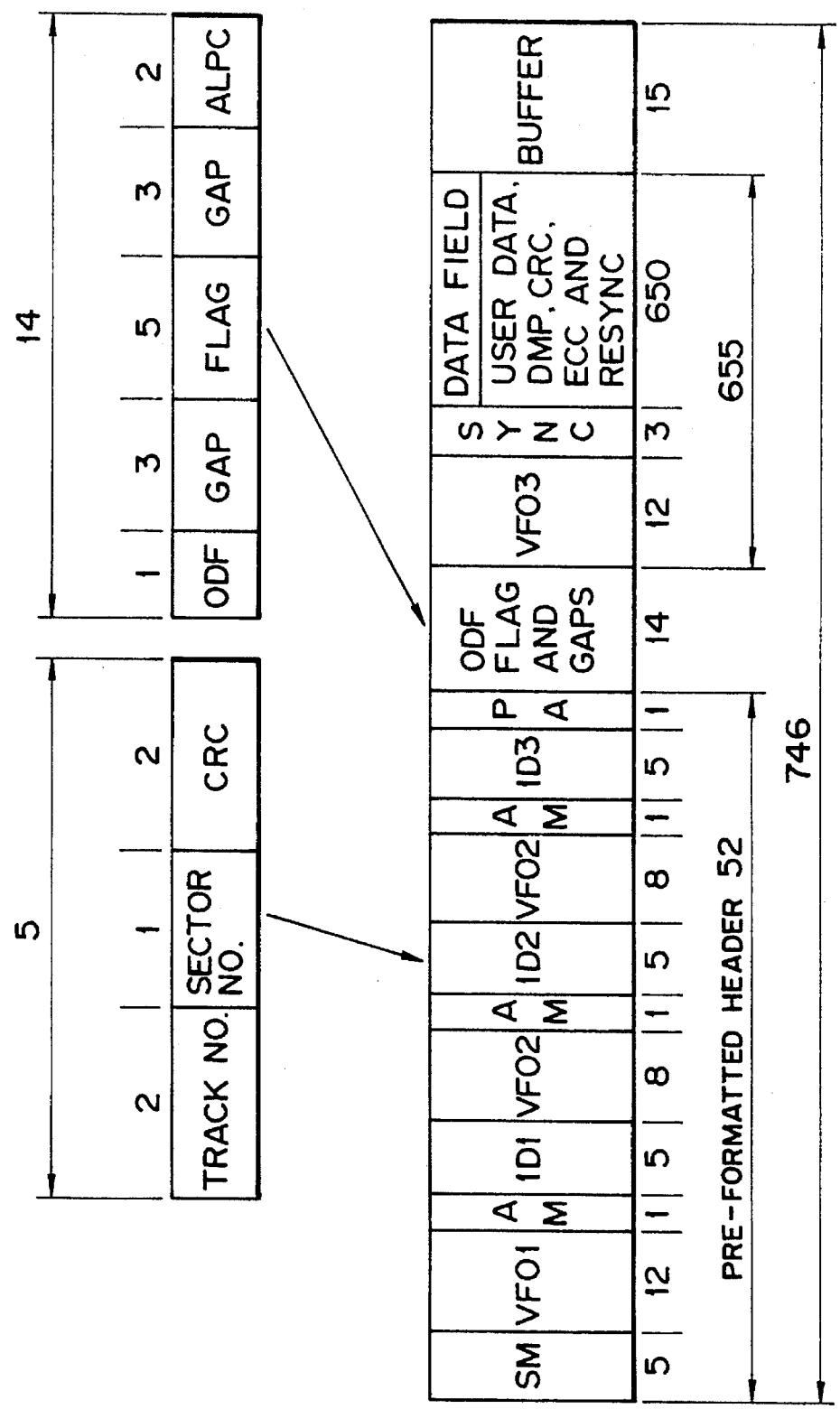
FIG. 9 is a schematic diagram showing another example of a sector format according to the current ISO standards for a 130 mm magneto-optical recording disk.
Figure 10:
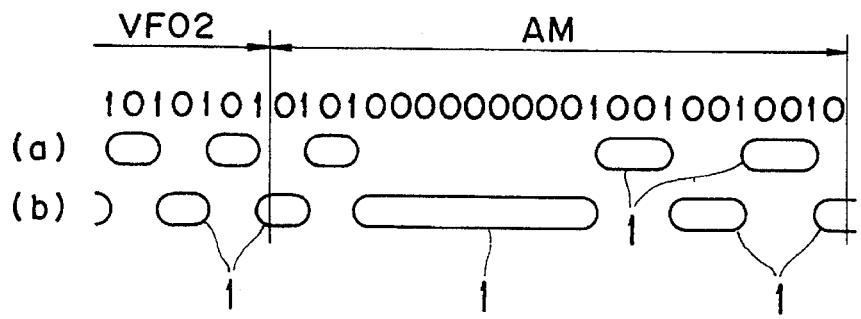
FIG. 10 is a schematic diagram for explaining the drawbacks of the mark edge recording method.

Still another embodiment of the present invention will now be explained with reference to FIG. 5 and FIG. 6.

This embodiment provides a sector format in such a manner that the head of the sector format can be reliably detected even in the case where a sector mark SM is eliminated from the sector format under the current ISO standards, with the preformat as previously explained with reference to FIG. 3 and FIG. 4 as a prerequisite.

Figure 11:
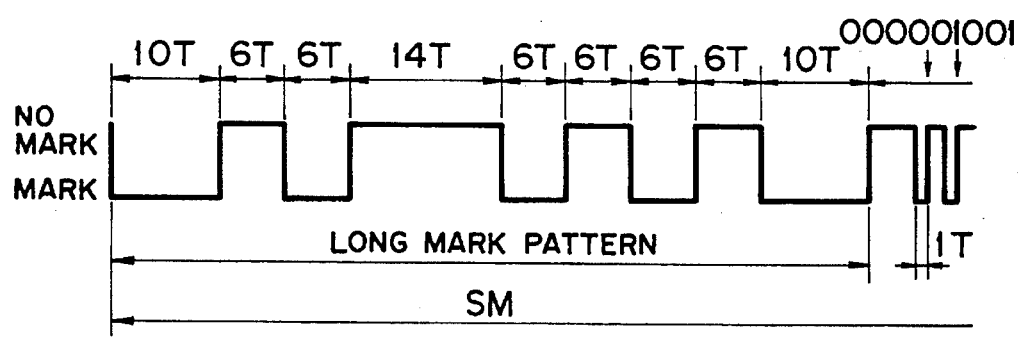
FIG. 11 is a schematic diagram showing an SM pattern according to the current ISO standards for a 90 mm magneto-optical recording disk.
Figure 12:
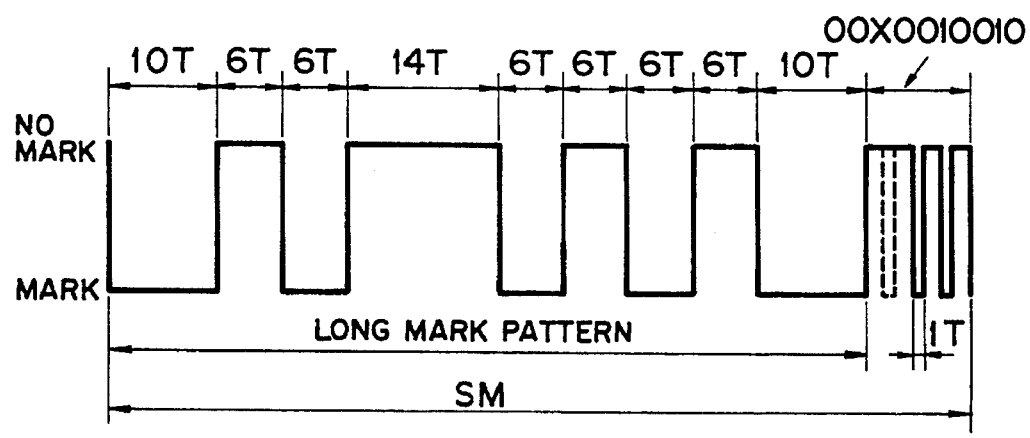
FIG. 12 is a schematic diagram showing an SM pattern according to the current ISO standards for a 130 mm magneto-optical recording disk.

Specifically, in the format of the current ISO standards, as explained with reference to FIG. 11 and FIG. 12, the sector mark SM makes the tracking control system unstable, resulting in an erroneous count in a seek operation. Therefore, if the sector mark SM is eliminated, this problem may be solved. However, if the sector mark SM is simply eliminated, an area without a prepit exists in two locations—a buffer positioned immediately after the data section, and the unnecessary areas (the area GAP1 or the areas GAP, FLAG, GAP, ALPC) in the previously described embodiments, therefore none of these can be distinguished as the head of the sector. As a result, the sector mark SM cannot be eliminated.

With respect to this point, in the present embodiment, for instance, the unnecessary areas GAP, FLAG, GAP, ALPC are preformatted with a predetermined pattern in the ROM section of a 130 mm magneto-optical recording disk, as shown by the parentheses (here, the same pattern as in the subsequent area VFO3). In a section other than the ROM section, as shown in (b) in FIG. 5, reproduction is carried out in the form of RF signals from the magneto-optical recording disk, so that an area without prepit continues. However, in the ROM section, the area without prepit is only in the buffer section, as shown in (c) in FIG. 5. Therefore, even without the sector mark SM, the head of the sector can be reliably detected. Accordingly, an algorithm for detecting the head of the sector comprises the steps of detecting whether or not the number of bytes having no prepits continuously is a designated number of bytes (according to the pattern in (c) in FIG. 5), and if detected, recognizing it as being a sector head, and moving onto making a check as to entering the area VFO1. This is also the same for the 90 mm ROM (including the partial ROM).

Therefore, according to this embodiment, a specified data pattern is preformatted in the unnecessary area with respect to the ROM section, so that the head of the sector can be detected even when the sector mark SM is eliminated. Accordingly, the inconveniences of instability in the operation of the tracking control system caused by the sector mark SM and erroneous counts for the number of jumped tracks during a seek operation are avoided, and a stable operation can be performed. Also, the area not used by the elimination of the sector mark SM can be utilized as an area for recording data, although it is not a large area, so that a still higher density can be provided.

In the first embodiment of the present invention, two types of preformat patterns are provided for the area VFO2 for a PLL in a magneto-optical recording disk, and the preformatting of the area VFO2 is carried out with a pattern selected according to whether or not a prepit which is preformatted in the area ID1 or ID2 positioned immediately before the area VFO2 is completed within that area, so that even in the case where the prepit is not completed within the area ID1 or ID2, it is possible to complete the prepit within the area VFO2. As a result, the length of the prepit can be minimized, and the operation of a tracking control system or the calculation operation for the number of jumped tracks during seek can be made stable.

Further, in this embodiment, a pair of preformatted patterns of two types for the area VFO2 can be made in the form of a specified pattern, so that those patterns are extremely effective pattern for a (1, 7) RLL modulation code which is suitable for the mark edge recording method.

In the second embodiment of the present invention, in a 90 mm ROM disk and in a 90 mm magneto-optical recording disk including a partial ROM section, an area GAP1 which is an unnecessary area for the ROM disk is utilized and a specified data pattern is preformatted in the area GAP1, so that the area GAP1 can be effectively used in practice for synchronous lead-in of the PLL and the like. In particular, when the data of the preformat for the area GAP1 is made identical to that for the preformat pattern for the area VFO3 which is positioned immediately after the area GAP1, this becomes substantially equivalent to the expansion of the area VFO3 for synchronous lead-in of the PLL, and the time for the PLL lead-in is increased so that surplus time is available and it is possible to reliably lock the PLL.

In the third embodiment of the present invention, in a 130 mm ROM disk and a 130 mm magneto-optical recording disk with a partial ROM section, the areas GAP, FLAG, GAP, and ALPC, which are unnecessary for the ROM disk, are utilized for preformatting a specified data pattern in these areas, so that these areas can be effectively used for synchronous lead-in of the PLL and the like.

In particular, in the above embodiment, when the data of the preformat for the areas GAP, FLAG, GAP, and ALPC is made identical to the preformat pattern for the area VFO3 which is positioned immediately after the above areas, this becomes substantially equivalent to the expansion of the area VFO3 for synchronous lead-in of the PLL, and the time for the PLL lead-in is increased so that surplus time is available and it is possible to reliably lock the PLL.

Furthermore, in the preformat configuration in the second and third embodiments of the present invention, when the sector mark SM is eliminated, the head of the sector can be detected without any problems even without the sector mark SM, so that the operation of the tracking control system and the calculation operation for the number of jumped tracks during seek can be performed in a stable manner.

What is claimed is:

1. An optical information recording medium in the form of a 90 mm ROM disk or a 90 mm magneto-optical recording disk including a partial ROM section, provided with a sector format which is preformatted in accordance with a mark edge recording method, wherein a specified data pattern is preformatted in the form of prepits in an unformatted area GAP with a specified byte.

2. The optical information recording medium as claimed in claim 1, wherein said specified pattern is identical to a preformatted pattern for a variable frequency oscillator area VFO3 positioned after said area GAP.

3. An optical information recording medium in the form of a 90 mm ROM disk or a 90 mm magneto-optical recording disk including a partial ROM section, provided with a sector format which is preformatted in the form of prepits in accordance with a mark edge recording method, wherein a specified data pattern is preformatted in an unformatted area GAP with a specified byte, and wherein a sector mark SM for detecting the head of a sector is eliminated from said sector format.

4. The optical information recording medium as claimed in claim 3, wherein said specified pattern is identical to a preformatted pattern for a variable frequency oscillator area VFO3 positioned after said area GAP.

5. The optical information recording medium as claimed in claim 1, wherein said specified pattern is a variable frequency oscillator area VFO3 prepit pattern.

6. The optical information recording medium as claimed in claim 3, wherein said specified pattern is a variable frequency oscillator area VFO3 prepit pattern.

* * * * *